United States Patent
Beamish et al.

(10) Patent No.: US 7,502,625 B2
(45) Date of Patent: Mar. 10, 2009

(54) INTEGRATED MULTI-BAND TRANSCEIVER FOR USE IN MOBILE COMMUNICATION DEVICE

(75) Inventors: Norman J. Beamish, Costa Mesa, CA (US); Darioush Agahi, Irvine, CA (US); Balasubramanian Ramachandran, Irvine, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 619 days.

(21) Appl. No.: 11/040,276

(22) Filed: Jan. 20, 2005

(65) Prior Publication Data
US 2006/0160564 A1    Jul. 20, 2006

(51) Int. Cl.
*H04Q 7/32* (2006.01)

(52) U.S. Cl. ............... 455/553.1; 455/552.1; 455/550.1; 455/422.1; 455/403; 455/500

(58) Field of Classification Search ............... 455/553.1, 455/552.1, 84, 74, 88, 344, 550.1, 422.1, 455/403, 500, 517, 73, 551, 466
See application file for complete search history.

(56) References Cited

U.S. PATENT DOCUMENTS

| | | | |
|---|---|---|---|
| 5,895,436 A | | 4/1999 | Savoie et al. ............... 701/214 |
| 5,978,689 A | * | 11/1999 | Tuoriniemi et al. ...... 455/569.1 |
| 5,991,637 A | * | 11/1999 | Mack et al. ............... 455/563 |
| 6,215,988 B1 | * | 4/2001 | Matero ..................... 455/188.1 |
| 6,728,517 B2 | * | 4/2004 | Sugar et al. .................... 455/73 |
| 6,806,838 B2 | * | 10/2004 | Petros et al. ................. 343/725 |
| 7,006,805 B1 | * | 2/2006 | Sorrells et al. ........... 455/188.1 |
| 7,242,912 B2 | * | 7/2007 | Maligeorgos et al. .......... 455/88 |
| 2002/0072326 A1 | * | 6/2002 | Qureshey et al. ........... 455/3.02 |
| 2004/0032373 A1 | | 2/2004 | Petros et al. ................. 343/725 |
| 2005/0233765 A1 | * | 10/2005 | Sanders et al. ........... 455/552.1 |

OTHER PUBLICATIONS

Wang-Chang; Gu, A "Integration of RF front-end module in cellular handsets" Oct. 2004, Solid-State and Integrated Circuits Technology, 2004. Proceedings. 7th International Conference on, vol. 2, pp. 1285-1290.*

* cited by examiner

*Primary Examiner*—Keith T Ferguson
(74) *Attorney, Agent, or Firm*—Weide & Miller , Ltd.

(57) ABSTRACT

A multi-band communication device configured with a mobile communication device for voice or data communication over a cellular, satellite or other communication network and configured with an auxiliary communication system configured to receive and/or transmit an auxiliary communication signal. The mobile communication device and auxiliary communication system are integrated into the same components within the multi-band communication device thereby allowing the components to share the processing tasks associated with each communication device within the multi-band communication device. The auxiliary communication device may be configured to operate during standby mode of the mobile communication device, such as during reception of a paging signal. The auxiliary communication device may comprise, but is not limited to, AM or FM radio, personal communication devices such as FRS, GMRS, or weather band radio.

6 Claims, 7 Drawing Sheets

INTEGRATED MULTI-BAND TRANSCEIVER FOR USE IN MOBILE COMMUNICATION DEVICE

FIELD OF THE INVENTION

The invention relates to communication systems and in particular to a method and apparatus for implementing a multi-band transceiver architecture into a mobile communication device.

RELATED ART

Numerous mobile communication devices are now available that include additional or bundled features as compared to previous models of mobile communication devices. One such feature that is now included with many mobile communication devices is an additional receiver, such as for example, to receive an FM radio signal, or digital processing capability, such as for example, to play MP3 encoded digital data. These added features provide added value to consumers and thus have become popular selling points among consumers.

Prior art mobile communication devices which also include an FM radio receiver suffer from many drawbacks. One such drawback is that prior art designs utilize a separate FM signal receiver and processing unit to receive and process the FM signal. This is done at least in part because of the vastly different type signals that comprise the FM radio signal and the mobile communication device signal. For example, these signals occupy different frequency bands, may be encoded or modulated using different schemes, and may be transmitted or received at different power levels. These factors combine to require, in prior art systems, a separate processing system for the FM receiver.

Figure 1:
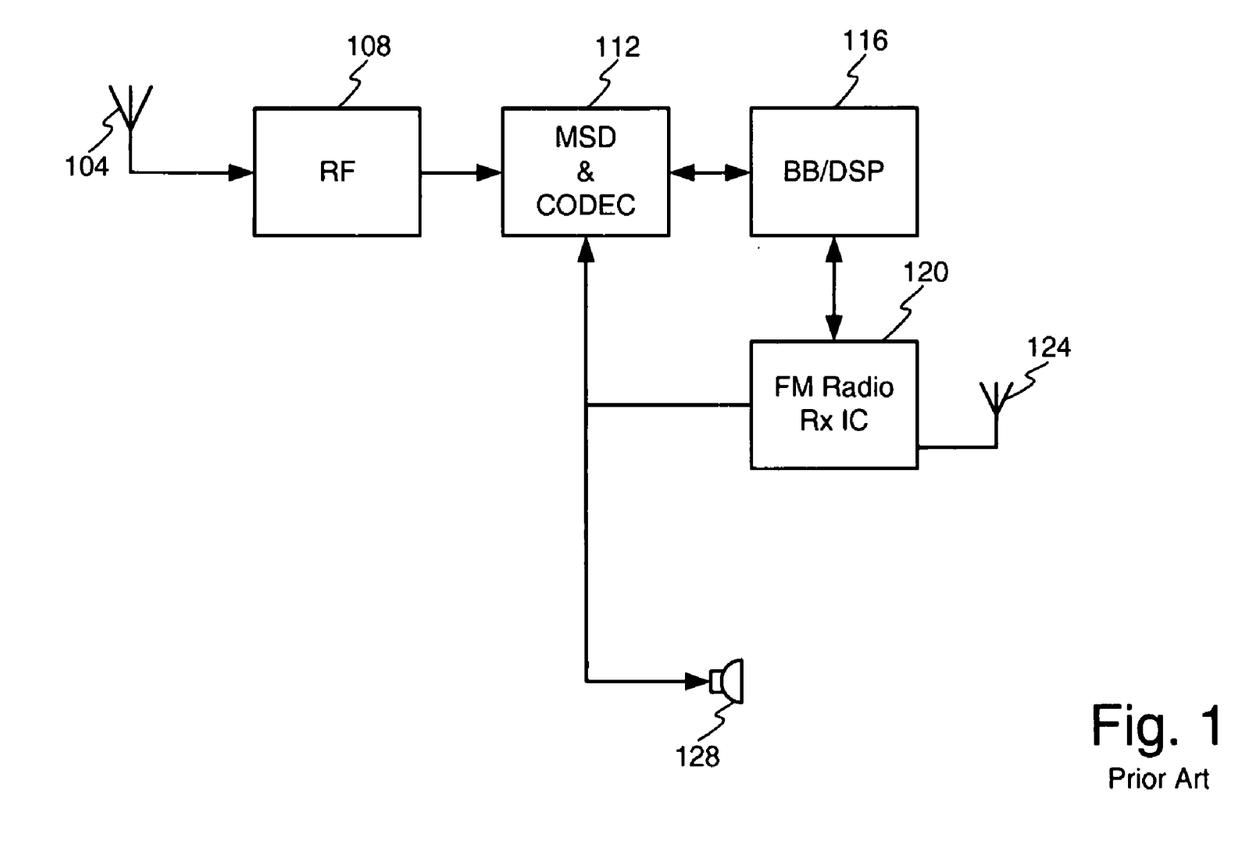
FIG. 1 is a block diagram illustrating a prior art communication device having external FM radio.

FIG. 1 illustrates an example embodiment of a prior art mobile communication device bundled with an FM radio. As shown, a mobile communication device antenna 104 connects to a RF receiver 108 tuned to the frequency band of the mobile communication device. The output of the RF receiver 108 connects to a mixed signal device 112, which may include a codec. The output of the mixed signal device 112 connects to a baseband processing device 116, such as a DSP configured to process a digital signal. The baseband processing device 116 and mixed signal device 112 also connect to an independent FM radio 120 that utilizes a second antenna 124 tuned to the particular frequencies for FM radio signal reception.

The FM radio 120 and MSD 112 include separate drivers to power a speaker 128. Thus, audio from both the radio 120 and the mixed signal device (MSD) 112 is provided to the audio speaker 128. In this embodiment, each of the blocks 108, 112, 116, 120 represent a separate integrated circuit, each of which communicate through one or more conductors and require power from an independent power source.

In some embodiments the analog audio signal from the FM receiver 120 will be transferred to the speaker 128 via the MSD 112. This allows the FM audio signal to be controlled by the same audio controls as other audio signals in the system such as voice and digital audio playback (e.g. volume, mute, treble, bass, etc.). This may require that the MSD 112 contains analog-to-digital conversion circuitry to convert the analog FM signal into digital form within MSD 112.

As a result, prior art communication systems that also include an FM receiver suffer from consumption of an excessively large amount of space, due to the additional and separate FM receiver structure. In addition, power consumption is also increased due to the need to power the separate FM receiver structure. As can be appreciated by those familiar with electronic device manufacturing, the cost associated with purchasing and installing the separate FM receiver is significant. In some instances, the cost of the separate FM receiver is equivalent to the digital portion of the mobile communication device 112, 116.

In addition, additional resources and space are consumed on the mobile communication device integrated circuit to provide an interface with the external and separate FM receiver. Thus the mobile communication device's integrated circuits are also affected, thereby increasing cost and size requirements of the mobile communication device components.

Consequently, there exists a need in the art for a mobile communication device that overcomes these drawbacks.

SUMMARY

The method and apparatus disclosed herein overcomes the drawbacks in the prior art and provides a low cost, size minimized, multi-band transceiver for use with or integrated into a mobile communication device. In one embodiment a multi-band communication device comprises a first antenna configured to receive a first signal and a second antenna configured to receive at least a second signal. In another embodiment, a single antenna may be used, which is capable of receiving the first and second signals, instead of two separate antennas. The first signal comprises a mobile communication device signal in a first frequency band and the second signal, for use by a device other than the mobile communication device, is in second frequency band. The multi-band communication device includes a mixed signal device comprising a first radio frequency device and a second radio frequency device. The first radio frequency device is connected to the first antenna and is configured as a transceiver to transmit and receive a mobile communication device signal, i.e. the first signal, convert the first signal to a first baseband signal, and convert the first baseband signal to a digital format.

The second radio frequency device is configured to receive the second signal radio frequency signal, convert the second signal to a second baseband signal, and convert the second baseband signal to a digital format.

The multi-band communication device also comprises a digital signal processor configured to receive and process the digital versions of the first baseband signal and the second baseband signal to thereby create one or more processed signals, which may be in analog or digital format. It is further contemplated that a user interface is provided and configured to control at least one aspect of operation of the first radio frequency device and the second radio frequency device. The user interface also provides at least one processed signal to a user such as in audio form for listening.

In one embodiment the device further comprises one or more digital to analog converters configured to convert the processed signal, if in digital format, to an analog signal. The second signal may comprise any type signal and in one embodiment is selected from the group of signals consisting of an FM signal, an FRS (Family Radio Service) signal, and a GMRS (General Mobile Radio Service) signal. In addition, the first baseband signal may comprise a paging signal or an active voice or data communication signal. In one embodiment the digital signal processor is configured to concurrently process the paging signal and the second baseband signal or process the active communication signal. Thus, the resources of the mobile communication device may be shared to better utilize the resources, as compared to the prior art. In one embodiment, the device further comprises a memory integrated with or connected to the digital signal processor. The memory may be configured to store machine readable code capable of processing the first baseband signal, the second baseband signal or both.

Also disclosed herein is a communication device configured to receive two or more wireless signals in at least a first frequency band and a second frequency band. In one embodiment this device comprises one or more RF components configured to receive the two or more signals and a mixed signal integrated circuit configured to perform analog and digital processing on the two or more signals such that the mixed signal integrated circuit is shared thereby performing processing on a signal in a signal in the first frequency band and a signal in the second frequency band. The device also includes a processor configured to process both the signal in the first frequency band and the signal in the second frequency band.

In one embodiment, the resources of the processor are shared between processing of the signal in the first frequency band and the signal in the second frequency band. This results in a less costly, more compact device. By way of example and not limitation, the processor comprises a digital signal processor configured to execute machine readable code. This may enable operation of cellular telephone communication. It is further contemplated that the signal in the first frequency band comprises a paging signal and that the processor is configured to process both the paging signal and the signal in the second frequency band.

Also disclosed is a method of operation of a multi-band communication device having an integrated mobile communication device and auxiliary communication device. One example method of operation of the multi-band devices comprises activating operation of a mobile communication device to standby mode and intermittently receiving a paging signal with a first set of components. The multi-band device then processes the paging signal with the multi-band communication device and, while intermittently receiving the paging signal, receives an auxiliary signal with the auxiliary communication device. The multi-band device then processes the auxiliary signal with the shared first set of components to thereby create a processed version of the auxiliary signal. The multi-band device may also provide the processed version of the auxiliary signal to a user.

In one embodiment, this method of operation further comprises monitoring for an incoming mobile communication device signal. Moreover, in one embodiment upon detecting the incoming mobile communication device signal, the method may further comprise ending the processing of the auxiliary signal, receiving the incoming mobile communication device signal with the first set of components, and processing the incoming mobile communication device signal with the first set of components.

For example, the first set of components may comprise a RF receiver, a mixed signal processing device, and a baseband signal processing device. It is contemplated that the auxiliary signal may be received from an auxiliary signal communication device or another multi-band communication device configured to transmit an auxiliary signal. In one embodiment, the auxiliary signal comprises an AM or FM radio signal, or both.

Also disclosed herein is a method for isolating two or more signals with a wireless multi-band communication device comprising receiving a first signal with a first antenna and then processing this first signal with a mixed signal device to demodulate the first signal to create a demodulated first signal. The method then processes the demodulated first signal with a digital signal processor to generate a first audio signal. As part of multi-band operation, the device may also receive a second signal with a second antenna and process the second signal with the mixed signal device to demodulate the second signal to create a demodulated second signal. The device then processes the demodulated second signal with the digital signal processor to generate a second audio signal.

It is contemplated that the first signal may comprise a cellular communication signal and the second signal may comprise a FM or AM radio signal. In addition, the method may further comprise, while receiving and processing the second signal, receiving a paging signal with the first antenna and then processing the paging signal with the mixed signal device to create a demodulated mixed signal device. The digital signal processor processes the demodulated paging signal. It is also contemplated that the method may further comprise receiving a third signal and processing the third signal with the mixed signal device to create a demodulated third signal. The demodulated third signal may then be processed by the digital signal processor.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 2:
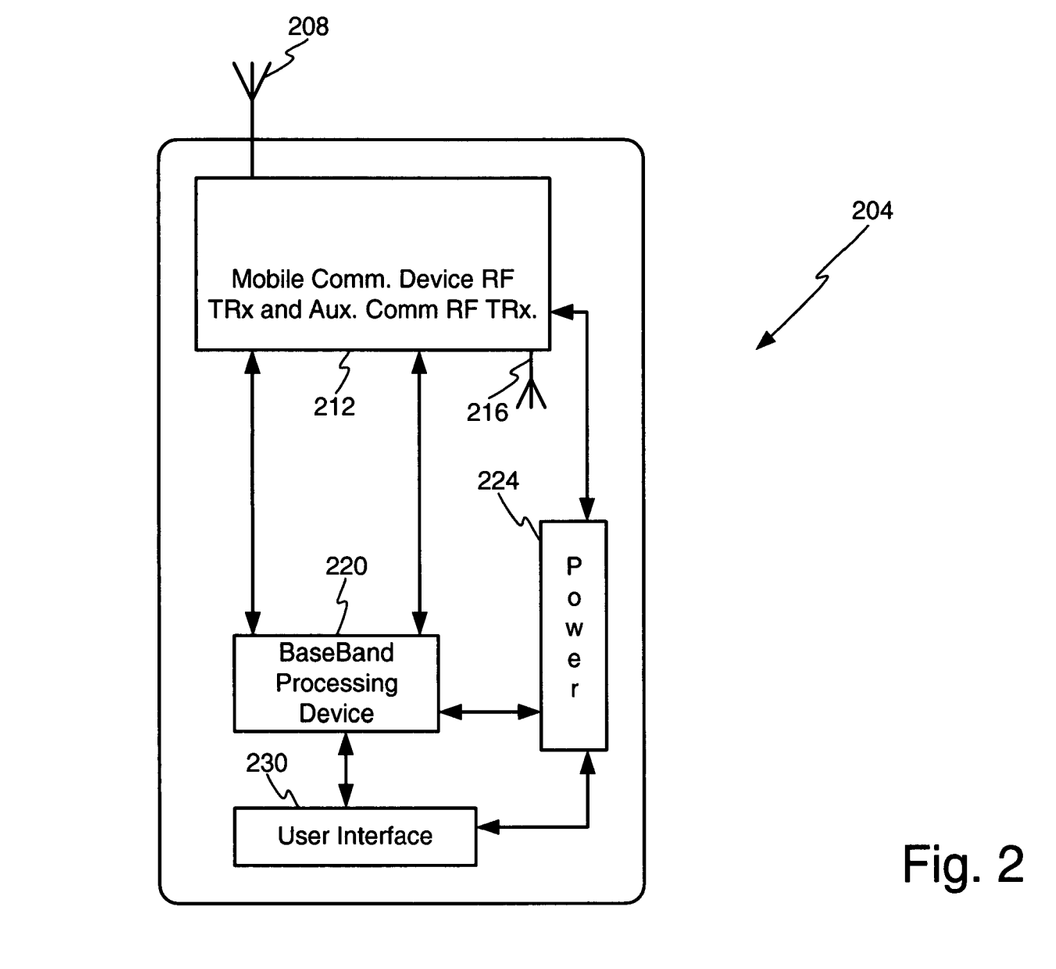
FIG. 2 is a block diagram illustrating an example environment for a multi-band communication device.

FIG. 2 illustrates a block diagram of an example embodiment of an example environment of use of the integrated multi-band transceiver. As is the case with all the embodiments and methods of operation described herein, this is but one possible example embodiment in one possible example environment of use and, as such, it is contemplated that one of ordinary skill in the art may arrive at other embodiments without departing from the scope of the claims that follow. In this embodiment a mobile communication device 204 is configured with an integrated multi-band transceiver to thereby provide mobile communication service through traditional cellular or other such communication paths and also receive and optionally transmit at frequencies other than that provided for by the traditional cellular service. The cellular service or satellite service may comprise any type communication service configured to connect a user to a public switch telephone network or directly, using cellular based communication technology and one or more cellular communication sites, to another user. Cellular service may comprise a mobile communications system that uses a combination of radio transmission and conventional telephone switching to permit telephone communication to and from mobile users within a specified area.

In this embodiment the mobile communication device with integrated multi-band transceiver 204 comprises a first antenna 208 configured for use by the mobile communication device. The first antenna 208 connects to a RF block 212 configured as a combined integrated mobile communication device RF transceiver and auxiliary communication RF transceiver. In one embodiment, an antenna 216 also connects to the RF block 212 and may be tuned to provide transmit and receive capability for the auxiliary communication RF transceiver.

The RF block 212 has the benefit of having both the mobile communication device components and the auxiliary communication device components built into and integrated into and within a single integrated circuit. As compared to prior art designs, this provides the benefit of a lower cost, less space consuming configuration.

The RF block 212 exchanges information with a baseband processing device 220 configured to process a baseband signal. The baseband processing device 220 may include a digital signal processor configured to execute software based instructions on the baseband signal, such as in the digital domain, to achieve the desired processing of the one or more incoming signals. A user interface 230 is in communication with the baseband processing device 220, the RF block 212, or both. A power source 224 connects to one or more of the elements 212, 220, 230 to provide power for mobile wireless applications.

It is contemplated that the baseband processing device 220 is configured to process both the mobile communication device incoming and outgoing signals and the auxiliary communication device signals, which may be incoming or outgoing. As a result, this configuration has the benefit of sharing the processing resources of the baseband processing device 220 to provide processing of signals associated with both the mobile communication device and the auxiliary communication device, both of which may be integrated into a single RF block 212. This configuration reduces cost, size, and power consumption as compared to prior art embodiments that utilize separate baseband processing devices to process the mobile communication signal and the auxiliary communication device signal. It is also contemplated that the baseband processing device 220 may be configured to simultaneously process the mobile communication device signal, such as for example, a paging signal to maintain contact with a base station during standby, and the auxiliary communication device signal. The term paging signal is generally defined as a one-way communication signal exchanged between a base station and mobile or fixed receivers to provide signaling or information transfer although it can also be used to include two-way communication signals between a base station and a mobile or fixed receiver. This allows for simultaneous use of two or more of the two or more communication systems integrated into the device 204.

It is contemplated that the auxiliary communication transceiver may be configured to transmit, receive, or both. For example, when configured as an FM radio receiver, the auxiliary communication transceiver may be configured as a receive only device. In other embodiments, the auxiliary communication transceiver may be configured as an emergency beacon or locator, and as such, it may be a transmit only device. When configured as a bi-directional communication device, the transceiver may both transmit and receive. The type of communication achieved by the auxiliary communication transceiver may comprise any type communication, utilizing any frequency band. By way of example and not limitation, the auxiliary communication transceiver may be utilized to provide or comprise any of the following type of communication: AM radio, FM radio, Family Radio Service (FRS), Weather Band, General Mobile Radio Service (GMRS), Citizen Band (CB), Multi-Use Radio Service, (MURS), traditional short range walkie-talkie communication, baby or other type monitoring system for mobile applications, television, satellite radio, Global Positioning Signals (GPS), traffic report frequency band, atomic clock, or any other type of communication.

Figure 3:
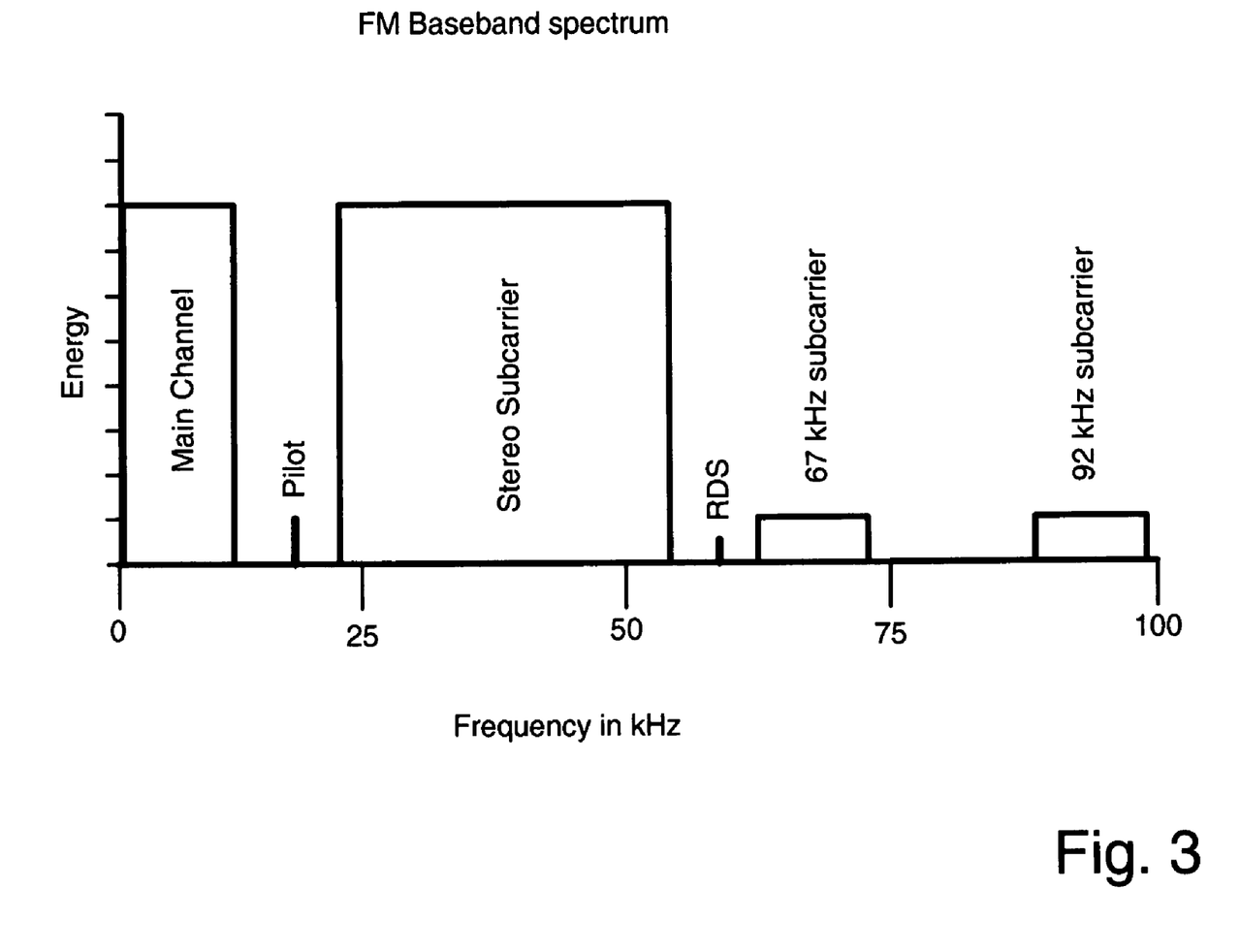
FIG. 3 illustrates exemplary frequency bands associated with sub-carrier FM radio signals.

In addition, the FM spectrum may be further utilized to provide signals at the sub-carrier frequencies. These sub-carrier frequencies may be used to carry information different from the primary FM audio. Examples include information, either audio or data, such as ethnic language broadcasting which would not command a large enough audience to justify a primary channel, or data information such as station information or traffic information. These sub-frequencies may be known as SCA (subsidiary communications authorization) channels. FIG. 3 illustrates exemplary frequency bands associated with sub-carrier FM radio signals. The illustration of FIG. 3 is not a complete list, but instead is provided for purposes of understanding.

It is also contemplated that the auxiliary communication device may comprise a Radio Data System, or RDS, which is a system for sending small amounts of digital information using conventional FM radio broadcasts. The RDS system standardizes several types of information transmitted, including time and station identification. RDS, which is widely used in Europe, is similar to RBDS, which is available in North America. The following information fields are normally contained in the RDS data:

AF (Alternate frequencies)—This allows a receiver to automatically re-tune to a different frequency providing the same station when the first signal becomes too weak (e.g. when moving out of range);

CT (Clock Time)—This function can synchronize a clock in the mobile communication device;

EON (Enhanced Other Networks)—This function allows the auxiliary receiver to monitor other stations for Traffic broadcasts;

PS (Program Service)—This feature is an eight-character static display that represents the call letters, station identity name, or other information. The auxiliary receiver may be configured to receive and display this information and, if the station is stored in the preset memory of the receiver, will cache this information with the frequency and other details associated with that preset;

PTY (Program Type)—This feature communicates a number of pre-defined music types (e.g. Classics, Pop, Middle of the Road Music) allowing a user to find a similar station or other similar communication system information.

REG (Regional links)—This features may be used in countries where national broadcasters run "region-specific" programming such as regional opt-outs on some of their transmitters. This functionality allows the user to "lock-down" the set to their current region or let the radio tune into other region-specific programming as they move into the other region.

RT (Radio Text)—This feature allows for transmission and reception of free-form textual information that can be either static e.g. station slogans or in sync with the programming such as the title and artist of the currently-playing song.

TA or TP—(Travel announcements)—A flag may be set or transmitted and by monitoring this flag, various actions may be taken. For example, the TP flag is used to allow the user to find only those stations that regularly broadcast traffic bulletins whereas the TA flag may be used for other functions, such as to stop another function or adjust the volume during a traffic bulletin.

(TMC)—Traffic Message Channel—This features/signal set detects and provides traffic updates.

With regard to implementation, the auxiliary communication device may be configured to support at least AF, EON, REG, PS and TA/TP. More feature rich devices may also offer TMC, RT and/or PTY, perhaps with "NEWS" override, PS, RT and PTY.

Figure 4:
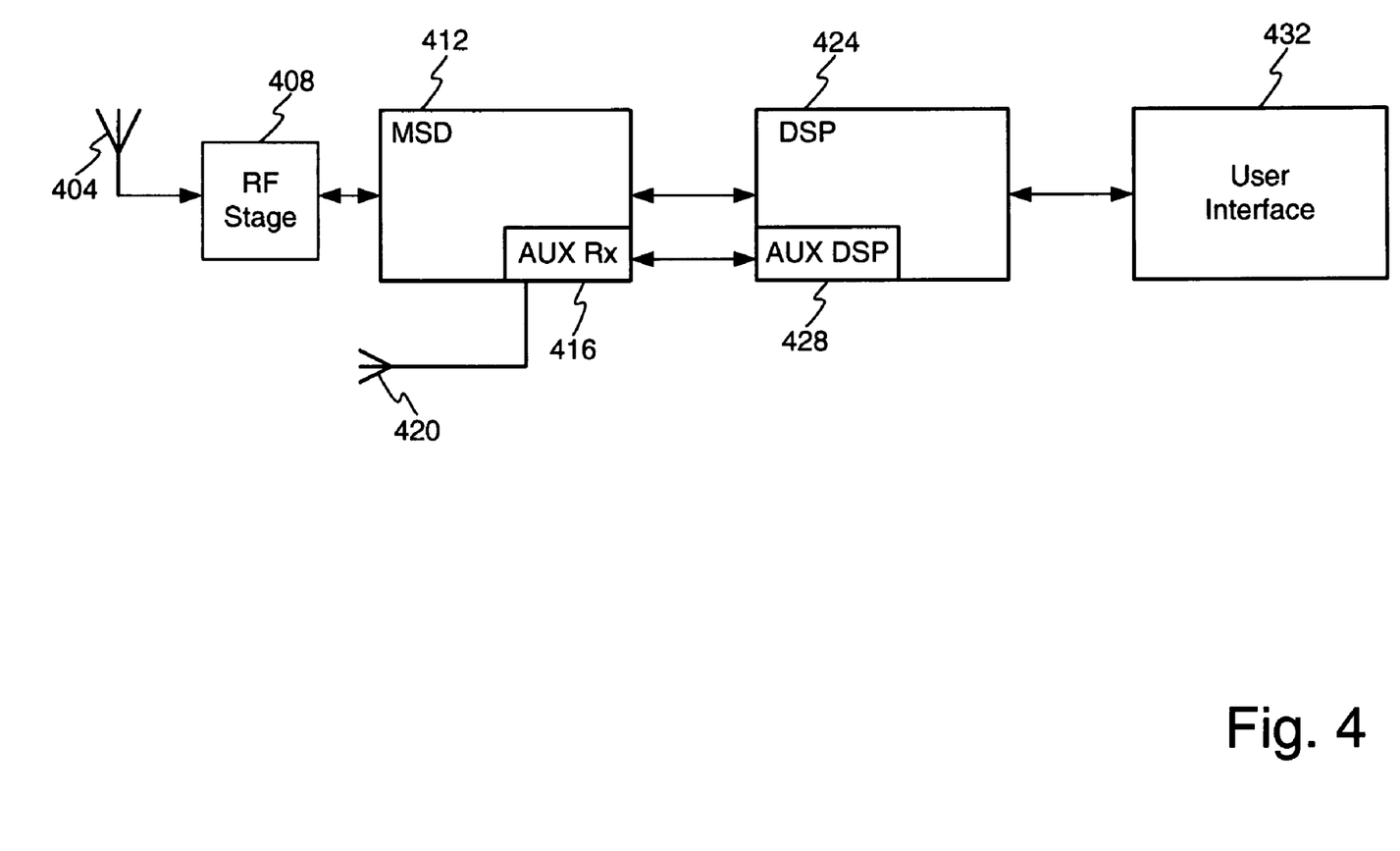
FIG. 4 illustrates a block diagram of a multi-band transceiver configured for use with a mobile communication device.

FIG. 4 illustrates a block diagram of a multi-band transceiver configured for use with a mobile communication device. It is contemplated that the embodiment and elements shown in FIG. 4 may be configured to transmit and receive.

As shown, an antenna 404 connects to a RF stage 408, which in turn connects to a mixed signal device 412. In this embodiment the mixed signal device further comprises an auxiliary receiver 416 which may, in one embodiment, connect to an antenna 420 dedicated for use with the auxiliary receiver. The auxiliary receiver may be tuned to any frequency band and in one embodiment integrated with the mixed signal device 412 into the same integrated circuit. It is contemplated that this embodiment may utilize the processing resources of the mixed signal device for both the mobile communication device and the auxiliary receiver. In this manner, a single resource is utilized to provide additional capability. As a result of sharing a single resource for multiple purposes, the cost increase is minimal, while greatly increasing capability and reducing size and cost for a multi-band device. It is contemplated that the mixed signal device 412 could be used for both mobile communication and auxiliary communication at the same time. For example, a user would not listen to the radio or use an FRS radio, while using their cellular phone. However, a user might listen to the FM radio while the cellular handset maintains synchronization with the cellular network by means of monitoring a paging signal transmitted by the cellular base station.

The cellular handset can automatically interrupt the delivery of FM audio to the user when there is an incoming telephone call. With this mode of operation the user can simultaneously enjoy an additional service (FM radio) without impairing the primary function of the cellular handset which is to act as a telephone. Furthermore, in this dual paging/FM radio mode the digital signal processing (DSP) capability of the handset, the primary function of which is to implement the cellular telephone function, can be reused to support FM radio reception. This is possible because paging mode requires only a small fraction of the DSP processing resources required to sustain the maximum data rate supported by the cellular handset. Reusing the available DSP resources for the FM function permits the analog portion of the FM receiver to be minimized in terms of circuit size and complexity. Similarly, when an auxiliary radio channel other than FM radio is used, the DSP resource can also be applied.

The mixed signal device 412 connects to a digital signal processor (DSP) 424. The DSP 424 is configured to perform digital processing of the signal(s) received from the mixed signal device 412 based on the software code, hardware configuration, or both, of the DSP. The software code may comprise or be referred to as machine readable code. In this embodiment the DSP 424 is integrally configured with software processing capability, hardware based processing 428, or both, to process the signal from the auxiliary communication device 428. The output of the DSP may feed into an data output, speaker, or any other processing device, output, or input device, such as a user interface 432. Thus, the resources of the DSP 424 may be shared between the mobile communication device and the auxiliary communication system thereby reducing cost and size of the multi-band communication device.

Figure 5:
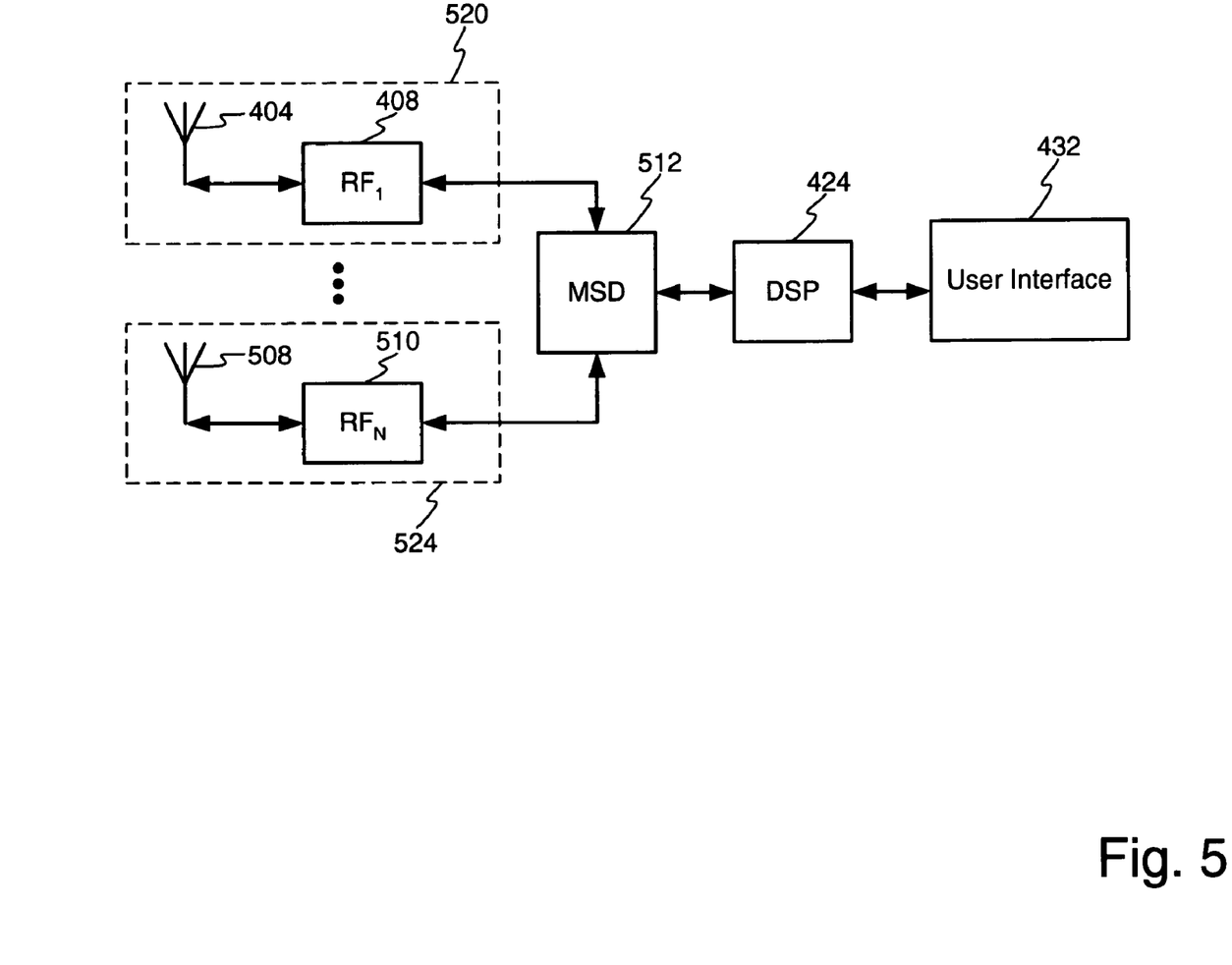
FIG. 5 illustrates an alternative embodiment having separate RF stages.

FIG. 5 illustrates an alternative embodiment having separate RF stages. Although shown with two stages, any number of stages may be utilized. As compared to FIG. 5, identical elements are labeled with identical reference numerals. In this embodiment, two or more RF stages 520, 524 are provided and connect to a shared mixed signal processing device 512. In this embodiment, the first RF stage 520 is configured for use by a mobile communication device or to receive a mobile communication device signal. The first RF stage 520 is configured with an antenna 404 and a RF signal processing unit 408. The RF unit 408 is configured or tunable to the one or more frequencies of the mobile communication device. Additional RF stages 524 may be provided up to and including an Nth RF stage shown by antenna 508 and RF device 510, where N is any whole number.

The RF stages 520, 524 connect to a shared mixed signal device 512 that is configured to receive the input from the RF stages, which may be at baseband or radio frequency, and process the incoming signal in accordance with the particular processing required for the communication standard and the signal being received. Use of a shared mixed signal device 512 configured for auxiliary communication capability provides the benefit of a reduction in resources while increasing device capability.

The output of the MSD 512 feeds into a DSP 424, which in turn connects to a user interface 432, both of which are described above in conjunction with FIG. 4, and hence are not described again. The DSP 424 and the user interface 432 are configured to process any of the signals received from the multiple RF stages 520, 524 from the communication device and the auxiliary communication system. In one embodiment, a single mixed signal device 512 is utilized and a single DSP 424 is utilized which provides the benefits set forth above.

Figure 6:
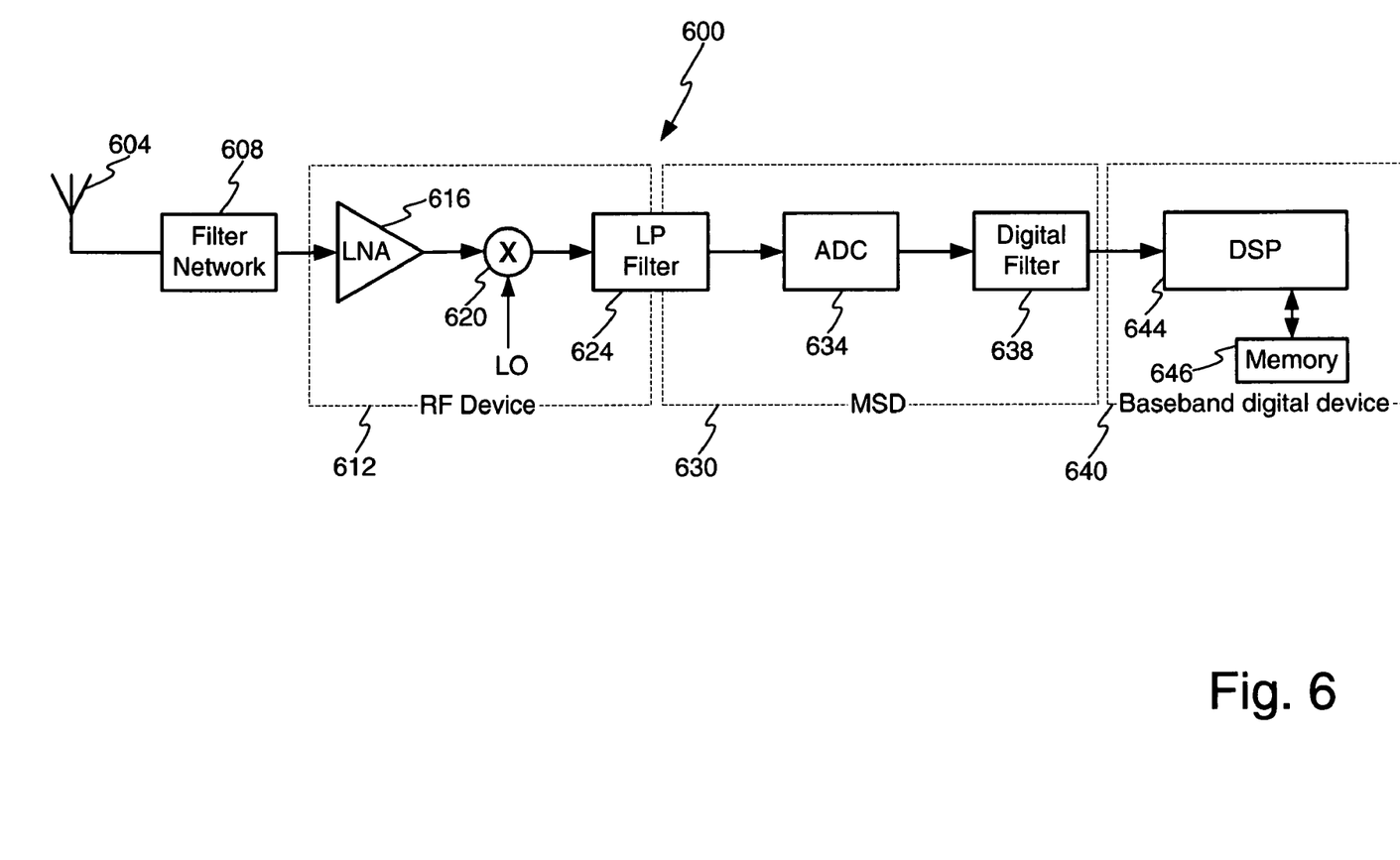
FIG. 6 illustrates a detailed block diagram of an example embodiment of an exemplary receiver system configured as a multi-band communication device.

FIG. 6 illustrates a detailed block diagram of an example embodiment of an exemplary receiver system configured as a multi-band communication device 600. In this embodiment the elements are configured for dual band processing thereby providing auxiliary communication device capability without adding additional and costly external components. As shown, an antenna 604 connects to a filter network 608. In this embodiment the frequencies of the signals received by the antenna and the filter network 608 are sufficiently close or related that the signal may be received and filtered by a single antenna 604 and filter 608. One of ordinary skill in the art is capable of building a filter network capable of selectively filtering and isolating two or more related frequencies. Although shown with one RF device, the signal antenna 604 may connect to two different RF stages.

The output of the filter network 608 connects to a RF device 612, which in this embodiment comprises a low noise amplifier (LNA) 616, a mixer 620, and optionally a low pass filter 624, which may be shared with a mixed signal device 630. The LNA 616 may be configured to amplify the received signal(s) while introducing little or no noise. The mixer 620, which receives the amplified signal from the LNA 616, also receives an input from a local oscillator, labeled in FIG. 6 as signal LO. The mixer 620 may be configured to utilize the LO signal to down-mix the RF signal to baseband or other desired frequency, such as an intermediate frequency.

As stated above, in this embodiment the mixer 620 and filter 624 are configured to isolate both the mobile communication device signal and the auxiliary communication device signal(s). As such, it is contemplated that the LO signal may be provided at more than one frequency. In other embodiments, more than one mixer 620 maybe utilized in the RF device.

In this embodiment, the output of the mixer 620 comprise the baseband signal which is provided to the low pass filter 624, which is shown as an element of both or either the RF device 612 and the MSD 630. It is contemplated that the filtering may occur in either the RF device 612, MSD 630, or both.

The MSD 630 comprises optional filters 624, one or more analog to digital converters 634 and one or more digital filters 638. These elements operate as generally understood in the art and these elements are further configured as multi-band devices, if necessary. For example, while the ADC may not require multi-band capability, the digital filter may be configured to filter or shift different frequencies for down stream processing.

The output of the MSD 630 connects to a baseband digital device 640, which in this embodiment comprises a DSP 644 configured to execute software code. The software code may be stored in memory 646. The software code is configured to process both the mobile communication device signal and the auxiliary communication device signal. Thus the DSP is shared between signal processing tasks, which generally do not occur simultaneously, but may occur simultaneously.

It is further contemplated that the memory may be accessible thereby allowing for modification to the software code stored thereon. Thus, the software code may be updated or upgraded. In addition, software code may be located onto the mobile communication device to meet the needs of the user or to allow for in-store or on-line configuration. By way of example and not limitation, a first user may prefer a mobile communication configured with an FM radio and a FRS radio system, while a second user may prefer a mobile communication configured with a Weather Band Radio and a SCA type radio system. To achieve this novel functionality, software code may be uploaded to the memory 646 in the mobile communication device to enable the desired auxiliary communication device functionality. It is further contemplated that this upload of desired code may control or enable various mixer operation or LO signal generation.

Figure 7:
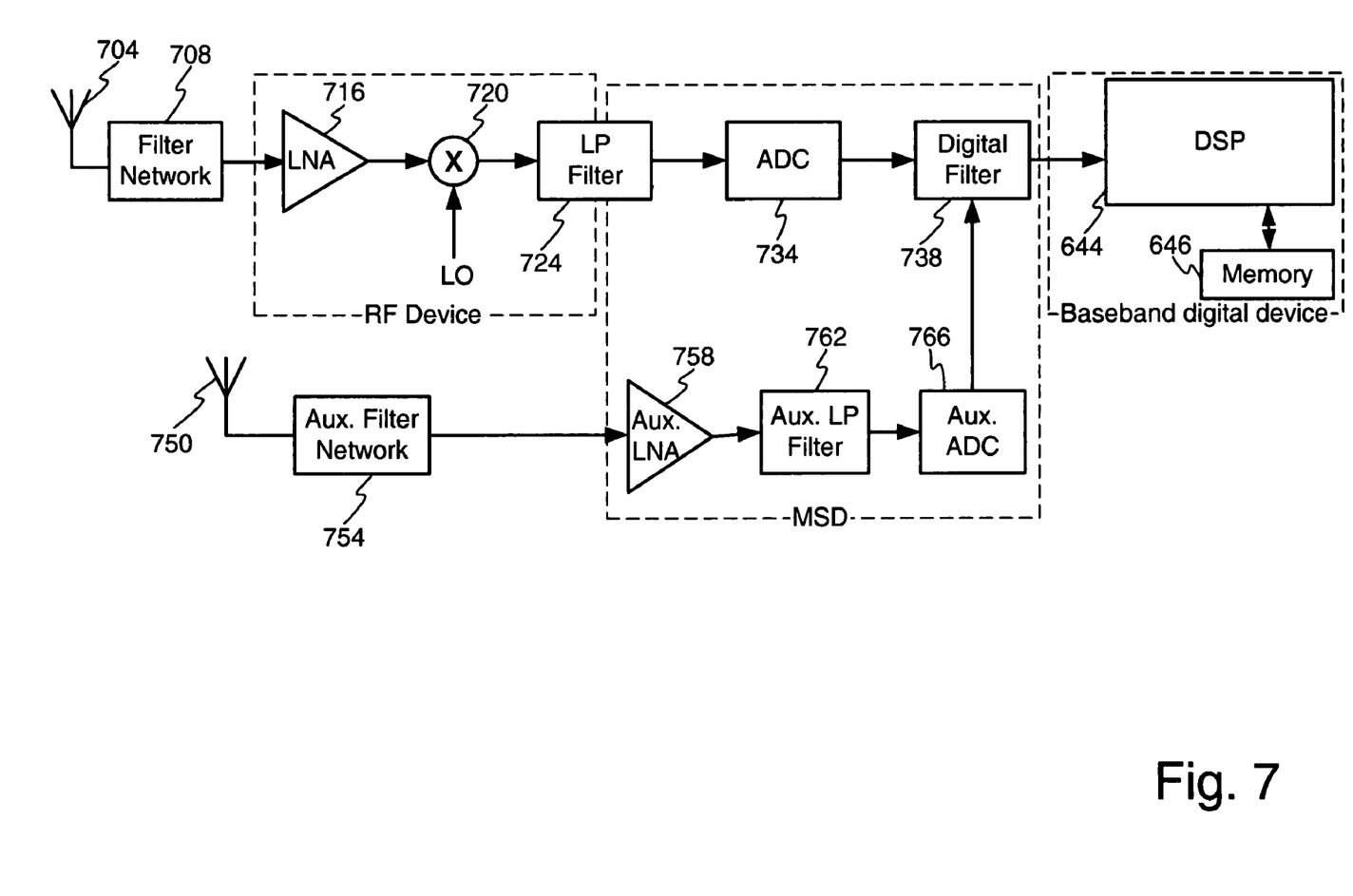
FIG. 7 illustrates a block diagram of an example embodiment of a multi-band device configured with a separate auxiliary communication device signal paths.

FIG. 7 illustrates a block diagram of an example embodiment of a multi-band device configured with a separate auxiliary communication device signal paths. As compared to FIG. 6, identical elements in FIG. 7 are labeled with identical reference numeral. Further, as compared to FIG. 6, the auxiliary communication system functionality of FIG. 6 is shown as utilizing the additional components, which are still integrated with the same integrated circuit chip set. This embodiment may be utilized, among other reasons, when the frequency band of the auxiliary communication device and the frequency band of the mobile communication device are sufficiently different that dedicated processing blocks, although located in a common or shared integrated circuit, are required or desired for any reason.

With regard to elements and processing blocks 704, 708, 716, 720, 724, 734, 738 and 644 operation is generally similar to corresponding elements and processing blocks as shown in FIG. 6 and hence operation of these elements is not discussed in detail again. These elements are, however, configured to perform the processing associated with the mobile communication device frequency band and potentially other related frequencies, but not signals in frequency bands that are sufficiently different from the mobile communication device frequency band. As such, these dedicated processing resources are separated, to the extent necessary from the embodiment shown in FIG. 6, and in particular, the RF device, and discussed below. When possible, processing operation are combined within and performed within a single integrated circuit.

An antenna 750 connects to an auxiliary filter network 754 configured to isolate an auxiliary communication signal such as any of the signals discussed above. In this example embodiment the output of the auxiliary filter network 754 connects to the mixed signal device comprising an auxiliary low noise amplifier 758, an auxiliary low pass filter 762 and an auxiliary analog to digital converter 766. These elements operate generally similar to the corresponding elements described in FIG. 6 or may operate to meet the particular design criteria for reception and processing of the auxiliary communication system. By way of example and not limitation, the low noise amplifier(s) 758 and filters 754, 762 would be tuned to the particular frequency or frequency band associated with the signals received and transmitted by the auxiliary communication device.

The output of the mixed signal device (MSD) connects to a baseband processing device 644, which in this embodiment comprises a digital signal processor (DSP) configured to process both the mobile communication device signal and the auxiliary communication device signal, which may be referred to as the auxiliary signal. In one embodiment the DSP 644 has the capability to execute software code which can process the mobile communication device signal during active mode, or the auxiliary communication device while still maintaining paging signal capability, such as below maximum processing rate. Thus, the auxiliary communication device may be used while the mobile communication device is in standby mode.

It is contemplated that the various features disclosed herein may be utilized alone or in any combination. While various embodiments of the invention have been described, it will be apparent to those of ordinary skill in the art that many more embodiments and implementations are possible that are within the scope of this invention.

What is claimed is:

1. A multi-band communication device comprising:
   a first antenna configured to receive a first signal comprising a mobile communication device signal in a first frequency band;
   a second antenna configured to receive at least a second signal in a second frequency band;
   a mixed signal device comprising:
      a first radio frequency device connected to the first antenna and configured to:
         transmit and receive a mobile communication device signal;
         convert the first signal to a first baseband signal;
         convert the first baseband signal to a digital format;
      a second radio frequency device configured to:
         receive the second signal radio frequency signal;
         convert the second signal to a second baseband signal;
         convert the second baseband signal to a digital format;
      wherein the first radio frequency device and the second radio frequency device are integrated into the same integrated circuit and are capable of concurrently outputting the digital versions of the first baseband signal and the second baseband signal;

a digital signal processor configured to concurrently receive and concurrently process the digital versions of the first baseband signal and the second baseband signal to thereby create one or more processed signals, which may be in analog or digital format;

a user interface configured to:

control at least one aspect of operation of the first radio frequency device and the second radio frequency device; and receive at least one processed signal and provide the at least one processed signal to a user.

2. The device of claim 1, further comprising one or more digital to analog converters configured to convert the processed signal, if in digital format, to an analog signal.

3. The device of claim 1, wherein the second signal is selected from the group of signals consisting of an FM signal, an FRS signal, and a GMRS signal.

4. The device of claim 1, wherein the first baseband signal may comprise a paging signal or an active communication signal.

5. The device of claim 4, wherein the digital signal processor is configured to concurrently process the paging signal and the second baseband signal or process the active communication signal.

6. The device of claim 1, further comprising a memory integrated with or connected to the digital signal processor, the memory configured to store machine readable code capable of processing the first baseband signal and the second baseband signal.

* * * * *